June 29, 1965 E. M. MATEA 3,191,268

PROCESS FOR ENCAPSULATING TRANSISTORS

Original Filed Feb. 28, 1958

INVENTOR.
Edmund M. Matea
BY
R. E. Fowler
ATTORNEY

United States Patent Office 3,191,268
Patented June 29, 1965

3,191,268
PROCESS FOR ENCAPSULATING TRANSISTORS
Edmund M. Matea, Covina, Calif., assignor to General Motors Corporation, Detroit, Mich., a corporation of Delaware
Original application Feb. 28, 1958, Ser. No. 718,275, now Patent No. 3,113,252, dated Dec. 3, 1963. Divided and this application Jan. 16, 1963, Ser. No. 251,803
3 Claims. (Cl. 29—155.5)

This invention relates to a method of encapsulation for electronic devices.

This patent application is a division of my copending United States patent application Serial No. 718,275 Matea, which was filed February 28, 1958, now Patent No. 3,113,252 granted December 3, 1963.

Transistors are conventionally hermetically sealed within an enclosure to protect them during normal use. The leads to the various electrodes are either brought through insulators in the housing or may form a part of the housing itself. As an example, in one type of transistor assembly, the base upon which the transistor is mounted is soldered to the collector electrode and forms an electrical lead for the same. The base also forms a mechanical closure member for the end of the cap which surrounds the transistor. Previously, caps were sealed to the base members by soldering or welding.

However, a transistor, both the main body, the ohmic and rectifying electrodes and soldered leads, are all affected by even moderate temperatures. To apply sufficient heat to the periphery of the cap to weld or solder it to the base, often made the transistor unfit for use, since an excess amount of heat, through inadvertence, might reach a vital spot.

It is therefore an object in making this invention to provide a method of sealing a semiconductive body within an enclosure without the use of heat.

It is a further object in making this invention to provide a cold hermetic sealing process for fabricating a transistor.

With these and other objects in view which will become apparent as the specification proceeds, the invention will be best understood by reference to the following specification and claims and the illustration in the accompanying drawings in which:

Figure 2:
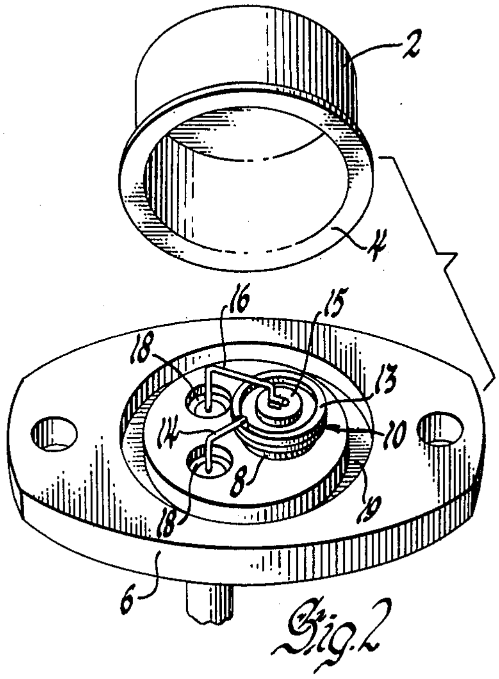
FIGURE 2 is a perspective view showing the cap and base in spaced relation.

Referring now more specifically to the drawings, the two parts of the transistor which it is desired to secure together and seal are best shown in FIGURE 2. This includes a cylindrical cap 2 having a flat flanged edge 4 at right angles to the main axis of the cap and extending out for a short distance therefrom. The base 6 of metal having good electrical and heat conducting properties has a centrally located pedestal 8 upon which the transistor body 10 is adapted to be mounted with the collector electrode 12 being soldered to the top of the pedestal 8. This, of course, mechanically connects the transistor to the mounting base. Various other electrodes 13 and 15 are connected through leads 14 and 16 respectively which extend through the mounting base and are electrically insulated therefrom by glass eyes 18.

Figure 1:
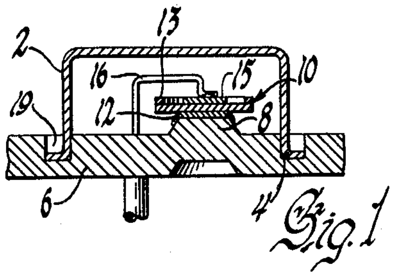
FIGURE 1 is a vertical section taken through a transistor assembly showing the cap in place on the base but no sealing step having been performed.
Figure 3:
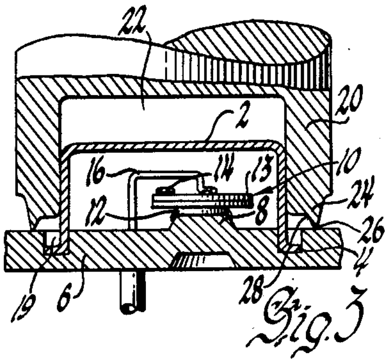
FIGURE 3 is a vertical sectional view of the transistor assembly and a partial sectional view of the forming die for crimping over a portion of the base to clamp the cap.
Figure 4:
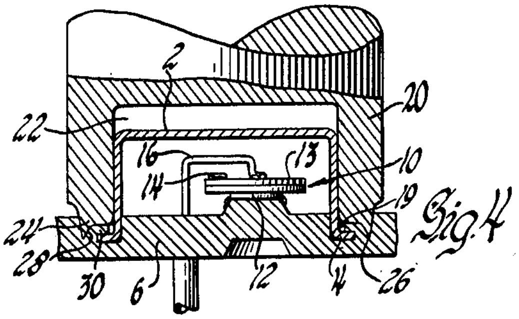
FIGURE 4 is a view similar to FIGURE 3 showing the die forced home to clamp the edge of the cap.
Figure 5:
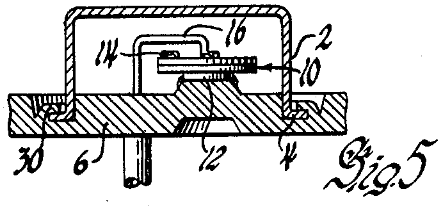
FIGURE 5 is a view similar to FIGURE 4 with the die removed.
Figure 6:
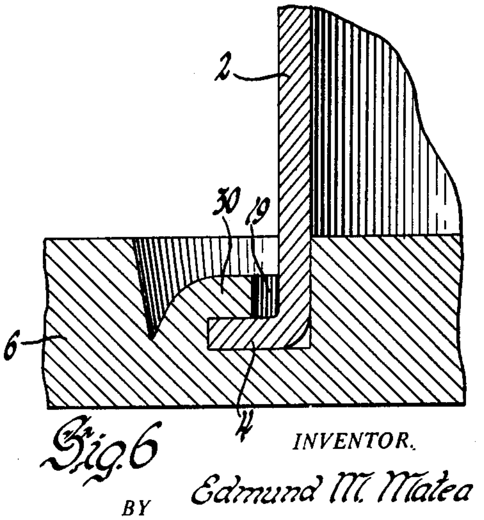
FIGURE 6 is an enlarged sectional view through the rim of the cap and base showing the clamping action of the crimped-over portion.

Around the area upon which the transistor is mounted and through which the leads pass, there is cut out an annular groove 19 having some depth. The radial dimension of the groove is approximately equal to the width of the flange 4 and is so cut that the flange of the cap may fall into the groove when placed over the transistor assembly. FIGURE 1 therefore shows the assembly in place with the cap resting on the bottom of the groove 19. A die 20 formed as shown in FIGURE 3 with a central aperture 22 fits down over the cap 2 and has an irregularly shaped annular cutting section 24. This section includes a sharpened annular ridge 26 whose diameter is slightly greater than that of the groove 19 and is provided to peel off or pare a section of the base and fold it down over the outwardly projecting edge of the flange 4. It therefore has a tapered inner surface 28 which as the die is brought down and pressed into the base, folds that portion 30 over against the flange 4. FIGURE 4 shows the assembly with the die brought home and crimping a portion of the base over the toe of the flange 4. FIGURE 5 shows the final assembly with the die 20 removed. FIGURE 6 shows in enlarged section, how this material is deformed to provide a satisfactory crimping and seal.

In order to assure that the two pieces will be so closely associated as to form a hermetic seal, with this form of assembly, there is introduced into the groove 19 prior to assembly a polymer fluorocarbon compound known commercially as "Kel–F." This fluorocarbon is mixed with a small amount of trichlorethylene. While various proportions of the two compounds may operate satisfactorily, it has been found that three grams of "Kel–F" mixed with 100 mils of trichlorethylene form a satisfactory compound. In order to introduce this compound into the bottom of the groove, the cap 2 is dipped into the solution, lifted out, and placed in a drying atmosphere for some time to dry out the trichlorethylene. It has been found that placing it in an oven at 110° C. for 10 minutes is sufficient drying. The parts are then assembled and the die applied. As an alternate method the groove 19 in the base is filled with the solution and dried in the same manner. The two parts are then assembled as shown in FIGURE 1 and mechanically sealed.

This method provides a very satisfactory encapsulation method for hermetically sealing transistor assemblies.

I claim:

1. The method of making an encapsulated signal translating device which comprises the steps of supporting a signal translating body on a metallic capsule base member, said base member having a relieved portion surrounding said body for mating engagement with a radially extending perimetric flange on a capsule cover member, coating at least one mating face of said members with a fluorocarbon sealing material, placing said cover over said signal translating body in said relieved area on said base, cutting a portion of said base member adjacent said relieved area, folding down the cut portion onto said cover flange and pressing the folded base member portion against said cover flange.

2. The method of making an encapsulated transistor which comprises the steps of supporting a transistor body on a metallic capsule base member, said base member having a groove surrounding said body for mating engagement with a radially extending perimetric flange on a capsule cover member, coating at least one mating face of said members with a fluorocarbon sealing material, placing said cover over said signal translating body in said groove on said base, cutting a portion of said base member adjacent said groove, folding down the cut portion onto said cover flange and pressing the folded base member portion against said cover flange.

3. The process as described in claim 2 wherein the fluorocarbon sealing material is applied to the groove in the base member and the sealing material is a mixture of a fluorocarbon sealant and a thinning agent that is dried before the cover is secured to the base member.

References Cited by the Examiner

UNITED STATES PATENTS

| | | | |
|---|---|---|---|
| 2,220,902 | 11/40 | Hastings et al. | |
| 2,331,449 | 10/43 | Wittenberg | 29—511 X |
| 2,724,893 | 11/55 | O'Connor et al. | 220—81 |
| 2,745,044 | 5/56 | Lingel | 317—234 |
| 2,957,236 | 10/60 | Kreuchen | 29—470.1 |
| 3,024,299 | 3/62 | Nijhuis et al. | 29—470.1 X |

OTHER REFERENCES

The Condensed Chemical Dictionary (6th edition), published by Reinhold Publishing Corporation (1961) (page 639 relied upon).

JOHN F. CAMPBELL, *Primary Examiner.*